Feb. 27, 1923.                                                     1,446,882
                            C. W. COX
              METHOD OF REPAIRING STORAGE BATTERIES
                      Filed July 28, 1919            3 sheets-sheet 1
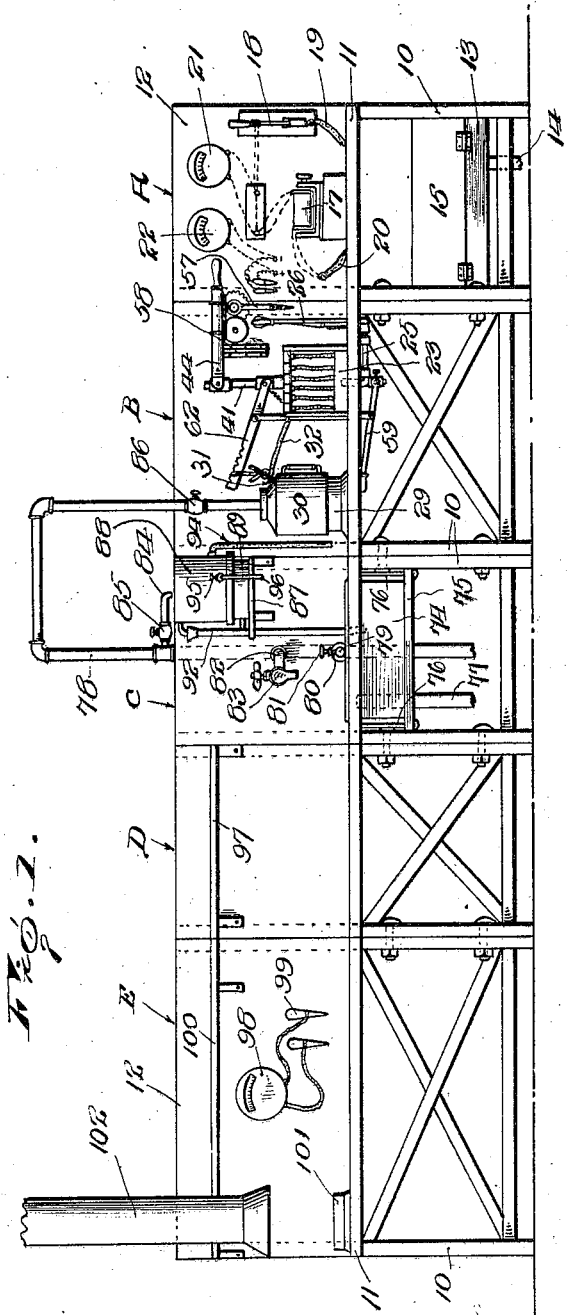
Inventor
C. W. Cox.
by Lacey & Lacey,
             Attorneys.

Feb. 27, 1923. 1,446,882
C. W. COX
METHOD OF REPAIRING STORAGE BATTERIES
Filed July 28, 1919 3 sheets-sheet 2
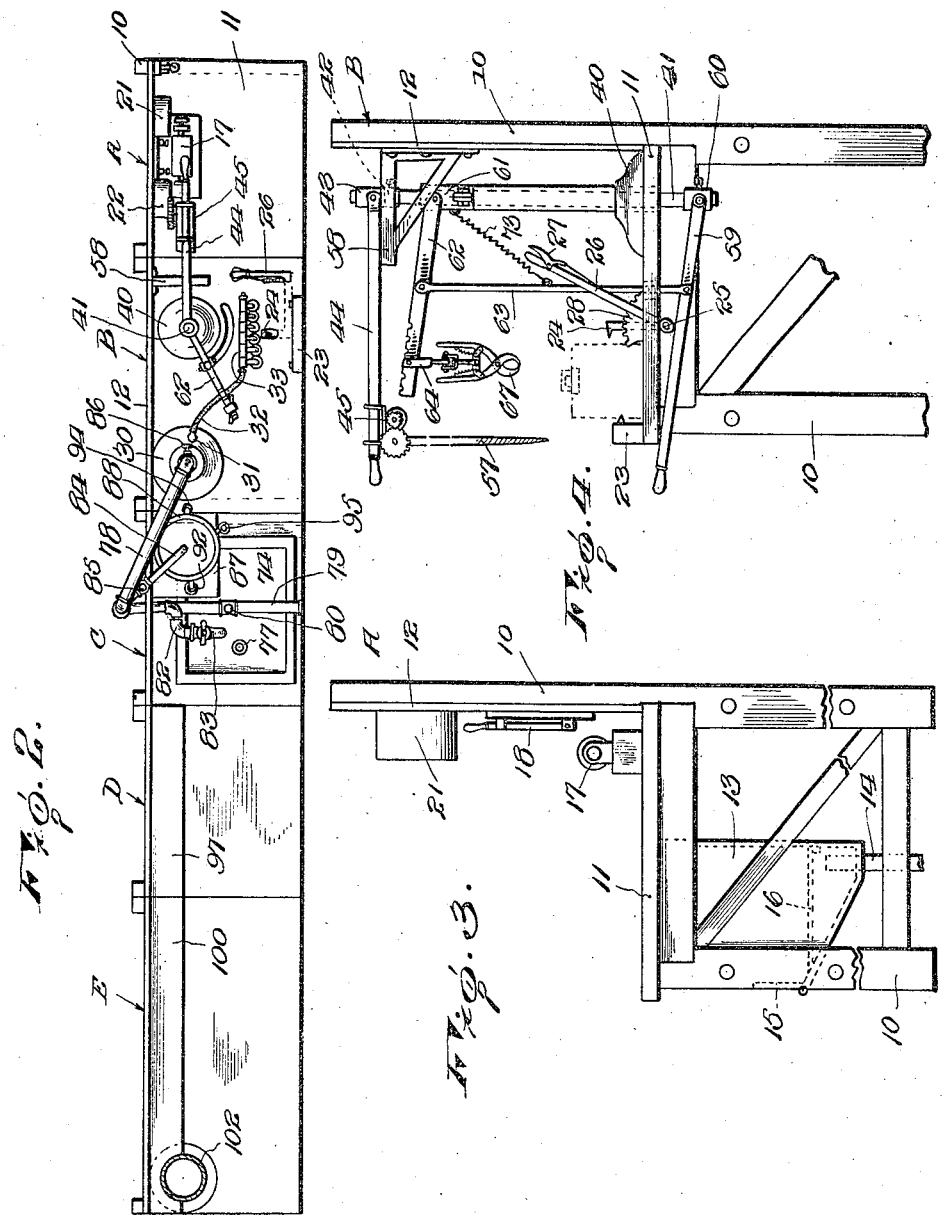
Inventor
C. W. Cox.
by Lacey & Lacey,
Attorneys.

Feb. 27, 1923.
C. W. COX
METHOD OF REPAIRING STORAGE BATTERIES
Filed July 28, 1919
1,446,882
3 sheets-sheet 3
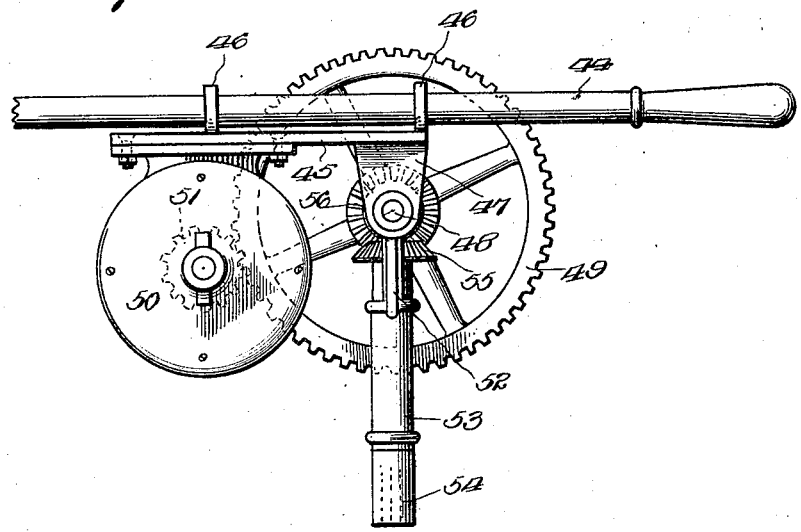
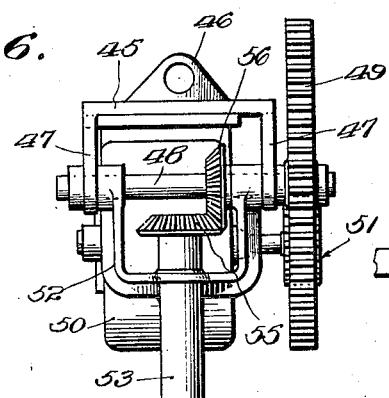
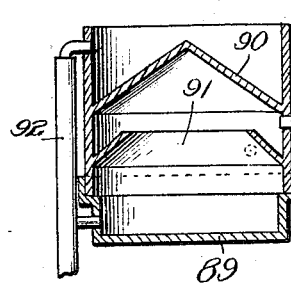
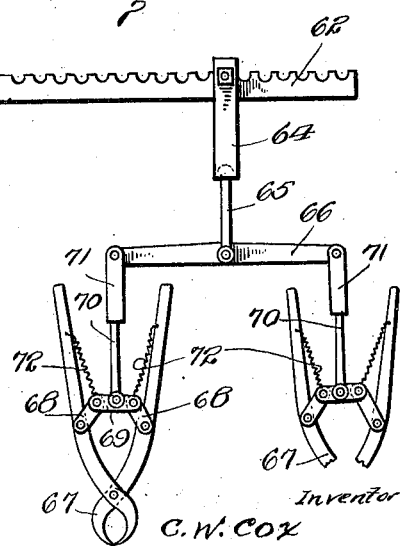

Patented Feb. 27, 1923.

1,446,882

UNITED STATES PATENT OFFICE.

CARLOS W. COX, OF AMES, IOWA.

METHOD OF REPAIRING STORAGE BATTERIES.

Application filed July 28, 1919. Serial No. 313,740.

*To all whom it may concern:*

Be it known that I, CARLOS W. COX, a citizen of the United States, residing at Ames, in the county of Story and State of Iowa, have invented certain new and useful Improvements in Methods of Repairing Storage Batteries, of which the following is a specification.

This invention relates to an improved method of repairing motor vehicle storage batteries and has as one of its principal objects to provide an apparatus whereby the labor involved in repairing a storage battery, as compared with existing methods, will be reduced practically to a minimum while, at the same time, a great saving in time will also be effected.

The invention has as a further object to provide a construction wherein after a storage battery has been initially placed upon a work bench employed, the battery may be tested, disassembled, cleaned, reassembled, again tested, and finally sealed without the necessity for taking the battery away from the bench, so that the battery need be lifted onto the bench but once.

The invention has as a still further object to provide a bench which will be constructed of sections and wherein each of the sections will be equipped for accomplishing a particular operation upon a battery so that a battery may be repaired by simply sliding the battery along the bench from one section to the other as the different stages of the repairing operation are reached.

A further object of the invention in this connection is to provide a construction wherein the sections of the bench will be detachably secured together so that the sections may be assembled from left to right or vice versa.

The invention has as a further object to provide an improved mechanism for drilling out the connectors of a battery so that after the battery elements have been loosened they may be withdrawn.

The invention has as a further object to provide an improved mechanism for steaming the battery cells for loosening the battery elements.

And the invention has as a still further object to provide an improved mechanism for withdrawing the battery elements from the cells.

Other and incidental objects will appear hereinafter.

In the drawings:

Figure 1 is a front elevation of my improved apparatus,

Figure 2 is a top plan view of the apparatus,

Figure 3 is an end elevation of what will be termed the first section of the work bench employed, Figure 4 is an end elevation of the second section of the work bench, Figure 5 is a fragmentary side elevation of the connector drill of the apparatus, Figure 6 is a front elevation of the connector drill, Figure 7 is a fragmentary side elevation particularly illustrating the post engaging tongs of the battery element withdrawing device employed, Figure 8 is a fragmentary perspective view showing the steaming tubes of the apparatus, Figure 9 is a fragmentary side elevation showing a typical nozzle as employed in connection with the steaming tubes, and Figure 10 is a detail sectional view of the condenser employed.

In carrying the invention into effect, I employ a work bench. This work bench is preferably formed of sections which, for convenience, have been individually indicated at A, B, C, D and E respectively. The sections are provided with suitable legs 10 and when the sections are assembled end to end the legs of adjacent sections abut and are detachably secured together by bolts or other suitable fastening devices. When the sections are thus assembled a bench table 11 is formed from which rises the back 12 of the bench. In this connection it is to be observed that by forming the bench in sections, the sections may be assembled in order from left to right, as shown in the drawings, or, if preferred, from right to left. As will later appear, a storage battery, during the course of its repair, is shifted from one section to the other along the bench and accordingly, the sections may, in practice, be arranged as will be found most convenient.

Taking up now each of the sections in detail. it will be seen that the section A, beneath the table thereof, is, as particularly shown in Figure 3, provided with a wash trough 13 from which leads a waste pipe 14. This trough may be of any approved character and is suitably secured upon the section so that the front side of the trough will be disposed adjacent the front side of the section. The trough is formed with a hinged front board 15 and mounted within the trough is a slatted tray 16. It is intended that all dirt, grease and other foreign substances shall be first washed from a battery in this trough, the battery being rested upon the tray 16. Mounted upon the table of the section is a rheostat 17 which may be of conventional type and connected to the back of the section is a switch 18 which may also be of conventional type. Connected to one terminal of the switch is an electrical conductor 19 and electrically connected with one terminal of the rheostat is a similar conductor 20. The free terminal of the switch and the free terminal of the rheostat are electrically connected and in a shunt circuit is an ammeter 21 so that, as will be seen, by applying the conductors 19 and 20 to the terminals of a battery, the battery may be tested to determine whether or not it is necessary to repair the battery or simply to recharge it. An approved volt meter 22 is also mounted upon the back of the section and electrically connected with this meter are suitable hand terminals which may be employed, as will be well understood, for gaining a reading of the voltage of a battery. Thus, it will be seen that a battery may be cleaned and tested upon the section A of the bench.

Mounted upon the table of the section B of the bench at the forward edge thereof is, as particularly shown in Figure 4 of the drawings, a block 23 the inner face of which is provided with one or more inwardly projecting spurs. Arranged to cooperate with this block is a clamping arm 24. This arm is mounted at one end upon a rock shaft 25 journaled in suitable bearings beneath the table of the section, the arm being freely received through a suitable slot in the table. Fixed to the opposite end of said shaft is an upstanding hand lever 26 also freely received through the table. This lever is equipped with a suitable latch 27 cooperating with a segment 28. Thus, as will be seen, a battery may, as suggested in dotted lines in Figure 4, be rested upon the table in front of the block 23. Then, by swinging the lever 26 forwardly the arm 24 will be moved to clamp the battery between said arm and the block when, by releasing the latch 27 the arm will be locked in this position so that the battery will be rigidly held upon the table. The section B, in addition to this mechanism for rigidly holding a battery thereon, is also equipped with mechanism for steaming the cells of the battery. This mechanism includes a suitable burner 29 arranged adjacent one end of the section table and rested upon this burner is a boiler 30. Leading from the top of the boiler is a steam discharge spout 31 over which is fitted one end of a hose 32. The opposite end of this hose is, as particularly shown in Figure 8, connected to a steaming manifold 33 fitted at its ends through the upper ends of posts 34 upstanding from the section table in spaced parallel relation and in the rear of the arm 24. The manifold 33 is provided with a series of outlets 35 controlled by valves 36 and connected with said valves are flexible tubes 37 equipped at their outer ends with nozzles 38. One of these nozzles is shown in detail in Figure 9 of the drawings. As there illustrated, each of said nozzles includes a frusto conically shaped body having its smaller end presented downwardly and opening through the apex of the body is a pipe 39, the pipes of the several nozzles being fitted in the outer ends of the tubes 37. The nozzle bodies are designed to be fitted in the vent openings of a battery when, by opening the valves 36, the sealing compound of the battery cells may be softened by the steam generated in the boiler 30 so that the elements of the battery may be withdrawn. I have shown the use of six steaming nozzles, making it possible to simultaneously steam all of the cells of a six cell battery. However, as will of course be understood, the number of steaming nozzles to be employed may be varied as desired.

The section B is also equipped with mechanism for drilling out the connectors of a battery so that the battery elements will be freed from each other. This mechanism includes a stand 40 arranged, as particularly shown in Figure 4, adjacent the back of the section in the rear of the steaming manifold 33. Loosely fitted through the sleeve of this stand is a post 41 which projects beneath the section table. Fitted upon the post adjacent its upper end is a collar 42 held in adjusted position vertically of the post by a suitable set bolt and sustained by this collar is a sleeve 43 rotatable upon the post. Pivotally connected with said sleeve is an arm 44 upon which is slidably mounted a drill. The drill is best shown in Figures 5 and 6 of the drawings. As will be seen, this drill includes a body plate 45 from which upstand longitudinally spaced lugs 46 slidably receiving the arm 45 therethrough. Depending from the forward end of the body plate are transversely spaced bearing arms 47 through which is journaled a shaft 48 carrying at one end a gear 49. Secured to the body plate at the rear end thereof is an electric motor conventionally indicated at 50 and the shaft of this motor is equipped at one end with a pinion 51 meshing with the gear 49. Swingingly mounted upon the shaft 48 between the bearing arms 47 therefor is a yoke 52. This yoke is provided with a depending sleeve 53 through which is journaled the shaft of a drill chuck 54. At the upper end of the sleeve said shaft carries a bevel pinion 55 which coacts with a bevel pinion 56 upon the shaft 48. The chuck is adapted to removably receive a bit conventionally indicated at 57. Thus, as will be readily understood, this bit may be rotated by the motor 50. By swinging the arm 44 downwardly, the drill may be lowered to engage the bit with the connector of a battery while by sliding the drill along the arm the bit may be properly positioned with respect to the connector. Furthermore, it is to be observed in this connection that the drill may also be swung about the longitudinal axis of the arm 44 while the yoke 52 may be swung about the axis of the shaft 48 for manipulating the bit. Consequently, the bit may be positioned at practically any angle desired with respect to the connector so that, as is proper, the center of the connector may be easily drilled out. When the drill is not in use, the arm 44 may, as shown in Figure 1, be swung to one side and rested upon a bracket 58 for supporting the drill in a position out of the way, the bracket being carried by the back of the section.

The section B is further equipped with mechanism for lifting the elements of a battery after the sealing compound of the battery cells has been softened and the top connectors have been drilled off. This mechanism includes, as particularly shown in Figure 4, a lever 59 which is pivoted at its inner end upon a sleeve 60 clamped or otherwise secured upon the lower end portion of the post 41 beneath the section table. Clamped or otherwise secured upon the upper end portion of the post and resting upon the sleeve of the stand 40 is a sleeve 61 supporting the post upon the stand and pivoted upon said sleeve is an arm 62. Swingingly connecting this arm with the lever 59 is a rod 63 extending vertically through a suitable arcuate slot in the section table. Adjacent its outer end the arm 62 is, as particularly shown in Figure 7, formed in its upper edge with a series of notches and arranged to selectively engage in said series of notches is the cross pin of a clevis 64. Swiveled upon this clevis is a yoke 65 which carries a pivoted cross arm 66 and pivotally connected with the ends of this arm are grab hooks 67. Pivotally connected to the handles of these hooks are links 68 the upper ends of which are coupled by links 69 and engaged with the links 69 are rods 70 swiveled upon yokes 71 carried by the ends of the cross arm. Engaged with the ends of the links 69 are springs 72 connected to the handles of the grab hooks and normally holding the grab hooks closed. If preferred, the links 69 may be engaged directly with the ends of the cross arm. As a means of normally maintaining the lever 59 and arm 62 elevated, a spring 73 is provided. As shown in Figure 4, this spring is connected at one end to the intermediate portion of the rod 63 while the opposite end of said spring is connected to the sleeve 61. Thus, this spring will normally hold the outer end of the lever engaging the section table therebeneath while the arm 62 will be inclined upwardly to sustain the grab hooks away from the table. However, by grasping the outer end of the lever 59 and swinging this lever downwardly to lower the free end of the arm, the grab hooks may be engaged with the posts of a battery element when, by pulling upwardly upon the lever, said element of the battery may be readily withdrawn from its cell. The remaining elements of the battery may, by repeating the operation, be likewise easily removed. When not in use, the lever 59 may be operated for swinging the arm 62 to one side, as shown in Figure 1, to a position out of the way.

Coming now to the section C of the bench, it will be seen that this section is provided with a sink 74 opening through the section table. This sink is sustained by cross pieces 75 extending therebeneath and adjustably connected with the section table by depending rods 76. Leading from the sink is a waste pipe 77 upstanding within the sink to form a trap. The sink is preferably lead lined for retaining the waste sediment from battery jars. Extending in the rear of the section C is a water supply pipe 78. Leading from this supply pipe through the back of the section and extending across the sink is a horizontally disposed branch pipe 79 closed at its outer end. This branch pipe is arranged substantially midway of the ends of the sink and is provided intermediate of its length with an upwardly directed nozzle 80 disposed centrally of the sink. Flow of water through this nozzle is controlled by a valve 81. Thus, after the battery elements have been removed from the jars therefor the battery case may be inverted over the nozzle 80 and a jet of water directed into each of the jars successively for thoroughly washing out the jars and removing all sediment therefrom. Leading through the back of the section from the pipe 76 above the pipe 77 is a second branch pipe 82 offset laterally out of the plane of the pipe 77 and equipped at its outer end with a suitable faucet 83 adapted to empty into the sink. Extending over the back of the section at the top thereof is a branch supply pipe 84 normally closed by a valve 85. Above the back of the section, the pipe 78 is directed horizontally and thence downwardly into the boiler 30, a valve 86 being provided for controlling flow of water into the boiler. Secured to the back of the section above one end of the sink is a shelf 87 and rested upon this shelf is a condenser. In Figure 10, I have shown the condenser in detail. As there illustrated, the condenser is formed with a cylindrical body 88 removably fitted upon a pan 89. Within the body is a conical partition 90 above which is formed a water chamber into which the pipe 84 is arranged to empty so that a supply of water may always be maintained within said chamber for cooling the partition. Below the partition is defined a steam chamber in which is arranged an upwardly sloping annular flange 91 secured to the wall of the body and providing a trap for distilled water formed by the condensation of steam against the partition 90. As will be seen, distilled water will collect around this flange and may overflow into the pan 89. The water chamber above the partition 90 is provided with an overflow emptying into a pipe 92 supported upon the shelf 87 and leading into the sink 71, and also discharging into the pipe 92 is an overflow for the pan 89. Leading into the steam chamber of the condenser is a pipe 93 to which is connected at one end a hose 94. This hose is of such length that it may be engaged at its free end over the steam discharge spout 31 of the boiler 30. Consequently, when a battery is not actually being steamed as previously described, the hose 32 may be disconnected from the discharge spout 31 and the hose 94 connected therewith when the steam from the boiler will be directed into the condenser and there converted back into water. Consequently, it will be unnecessary to extinguish the burner 29 when it is not desired to use steam from the boiler since this steam will be converted and practically none of the water wasted. Leading from the condenser at the base of the flange 91 is an outlet pipe which carries a valve 95 and extending from this valve is a hose 96. Thus batteries may, as is proper, be readily refilled with distilled water.

The section D of the bench is designed for use simply as an inspecting section. In other words, the parts of a battery are brought, at the proper stage in repair of the battery, to this section of the bench to be carefully examined. Preferably, the back of the section is provided with a shelf 97.

The section E of the work bench is intended for use as an assembling section. The section is accordingly equipped with a suitable polarity indicator 98 secured to the back of the section and provided with appropriate hand terminals 99. Mounted upon the back of the section above this indicator is a shelf 100 registering with the shelf 97 of the section D. Arranged upon the section table adjacent the outer end thereof is a burner 101 which may be of any appropriate type and depending over the burner is a ventilating pipe 102. The burner is provided for heating a sealing compound to be employed in resealing a battery after it has been repaired. Having thus described the structural details of my improved apparatus I shall now proceed to explain the manner in which the apparatus is used in repairing a battery.

Initially a battery is preferably washed in the trough 13 when the battery is lifted to the table of the section A. As shall now appear, it will not be necessary to remove the battery from the work bench throughout the course of its repair. In thus making it necessary to lift the battery but once, considerable effort is saved, as compared with ordinary methods requiring a battery to be repeatedly lifted to a work table and removed therefrom. After the battery has been placed on the table of the section A it is tested to determine whether the battery needs repair or simply needs recharging. In the latter event the battery is removed and recharged. On the other hand, should it develop that the battery needs repair, it is then slid from the section A onto the table of the section B and is moved to a position in front of the block 23. The hand lever 26 is then operated to firmly clamp the battery upon the section table. This done, the vent plugs of the battery are removed when the nozzles 38 are fitted in the vent openings of the battery cells and the valves 36 opened to admit steam into the battery for softening the sealing compound thereof. While the steaming operation is thus in progress the drill is brought into position, as previously described, and operated for drilling out the battery connectors. Thus, what has heretofore been two distinct operations which it has been necessary to perform separately are, in the present instance, accomplished simultaneously. By the time the top connectors have been drilled off, the sealing compound of the battery will probably have softened sufficiently to permit the withdrawal of the battery elements. Accordingly, the drill is swung to one side and the arm 62 swung forwardly over the battery. The lever 59 is then operated for successively pulling the battery elements out of the jars therefor and as each element is withdrawn it is tilted and allowed to rest upon the upper end of its jar to drain. After draining, the insulators of the battery elements are removed and the plates are washed in the sink 74 when the parts of the elements are taken to the section D of the work bench. Coincidently, the battery jars are, as previously described, washed out at the sink, when the battery case is taken to the section D. Upon reaching this section all of the parts of the battery are carefully inspected and when found necessary are renewed after which the battery parts are moved along to the section E of the bench. Upon reaching this section the several parts of the battery are reassembled and the battery sealed. I accordingly provide an apparatus whereby a battery may be expeditiously repaired with efficiency.

Having thus described the invention, what is claimed as new is:

1. The method of repairing a storage battery which consists in steaming the battery cells, drilling off the top connectors of the battery simultaneously with the steaming of the cells, subsequently withdrawing the battery elements, washing the battery jars and elements, and reassembling the battery.

2. The method of repairing a storage battery which consists in steaming the battery cells, drilling off the top connectors of the battery, withdrawing the battery elements, and reassembling the battery.

3. The method of repairing storage batteries which consists in supporting a battery, heating the battery cells, withdrawing the battery elements, and assembling the battery without removing the battery from its support.

4. The method of repairing storage batteries which consists in supporting a battery, heating the battery cells, drilling off the top connectors of the battery, washing the battery elements, and assembling the battery without removing the battery from its support.

5. The method of repairing storage batteries which consists in heating the battery cells, removing the top connectors of the battery, withdrawing the battery elements, washing the battery jars and elements, and reassembling the battery.

In testimony whereof I affix my siganture.

CARLOS W. COX. [L. S.]